United States Patent
Hepler

(10) Patent No.: US 6,527,126 B2
(45) Date of Patent: Mar. 4, 2003

(54) COFFEE FILTER RESTRAINT AND FLAVOR SYSTEM

(76) Inventor: Michael D Hepler, 22 Second Ave., West Berlin, NJ (US) 08091

(*) Notice: Subject to any disclaimer, the term of this patent is extended or adjusted under 35 U.S.C. 154(b) by 30 days.

(21) Appl. No.: 09/893,142

(22) Filed: Jun. 27, 2001

(65) Prior Publication Data
US 2003/0006185 A1 Jan. 9, 2003

(51) Int. Cl.⁷ .............................................. B01D 35/00
(52) U.S. Cl. ...................... 210/477; 210/482; 210/456; 210/483; 210/480; 210/198.1
(58) Field of Search ................................ 210/232, 473, 210/477, 479, 480, 481, 482, 456, 483, 198.1; 99/290, 295, 305, 306; D7/400, 213

(56) References Cited
U.S. PATENT DOCUMENTS
286,813 A * 10/1883 Haskell
6,116,459 A * 9/2000 Wilson

* cited by examiner

Primary Examiner—Joseph W. Drodge
Assistant Examiner—Terry K. Cecil
(74) Attorney, Agent, or Firm—Michael I Kroll

(57) ABSTRACT

The present invention 10 discloses a plastic two-piece filter restraint housing 38 having a spring 32 within each two post portion of the device which spring is held therein when the portions of the restraint are joined together. The housing 38 utilizes four pivotal end tabs 16 that are removable, pivotal, circular wedge angled supports 16 or optional straight wedge shaped supports 40 that will accommodate the standard circular or square coffee filter holder assembly 20. The filter device of the present invention keeps a coffee filter from collapsing while brewing automatic drip coffee by compressing the tabs 16 on the device, inserting them inside the coffee filter 18 and holder assembly 20 and then releasing the tabs 16 of the device so that they will retain the filter 18 firmly in position. The interchangeable tabs 16, 40 will accommodate a circular or square type filter assembly. A water distribution cone 38 is also provided that will disperse the flow of a steady stream of water across the coffee grounds 24, which is also interchangeable with a provided flavor cube tray 26. The flavor cube tray 26 allows the user to accent, enhance or flavor their original automatic drip coffee as desired.

16 Claims, 8 Drawing Sheets

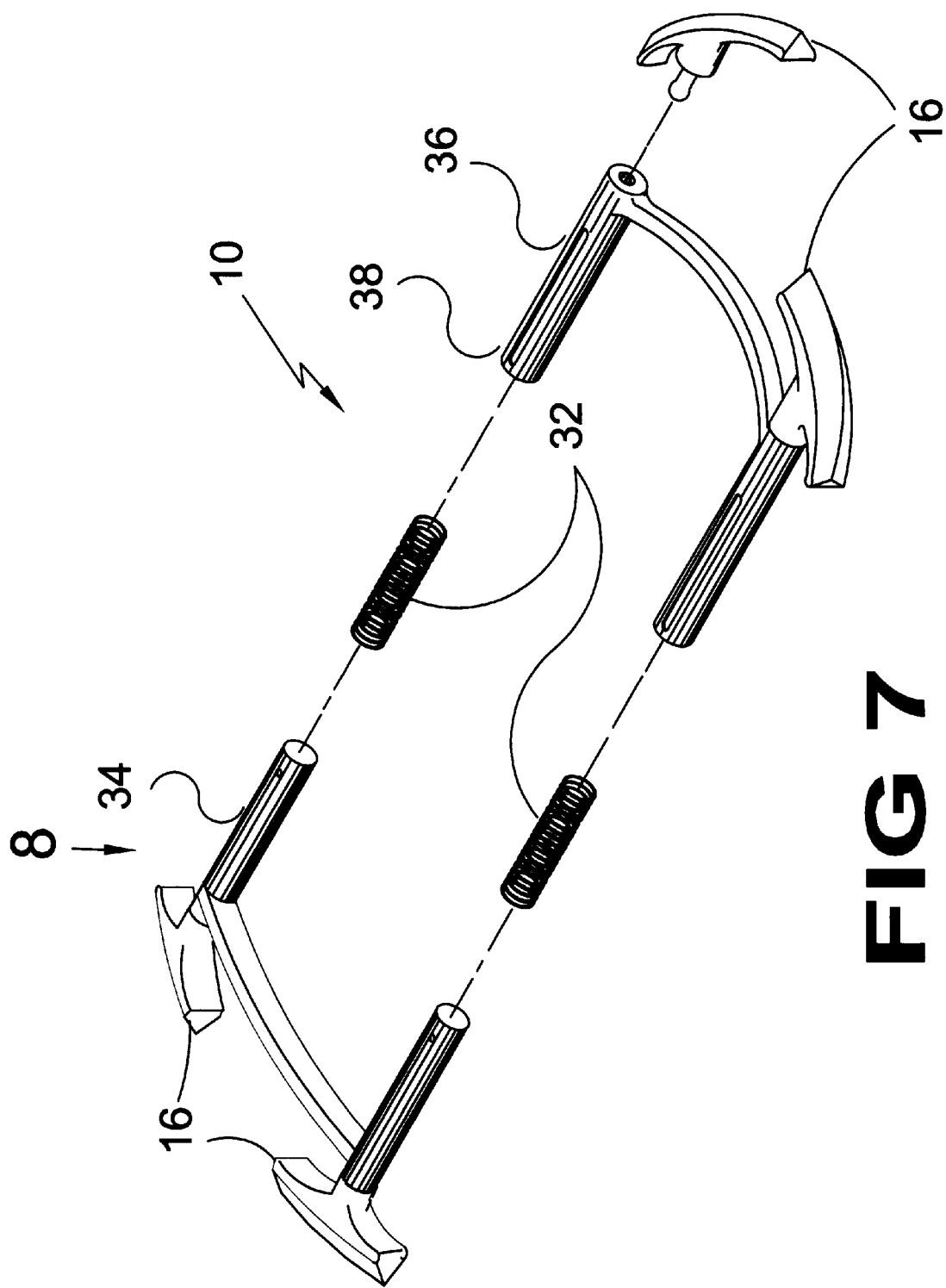

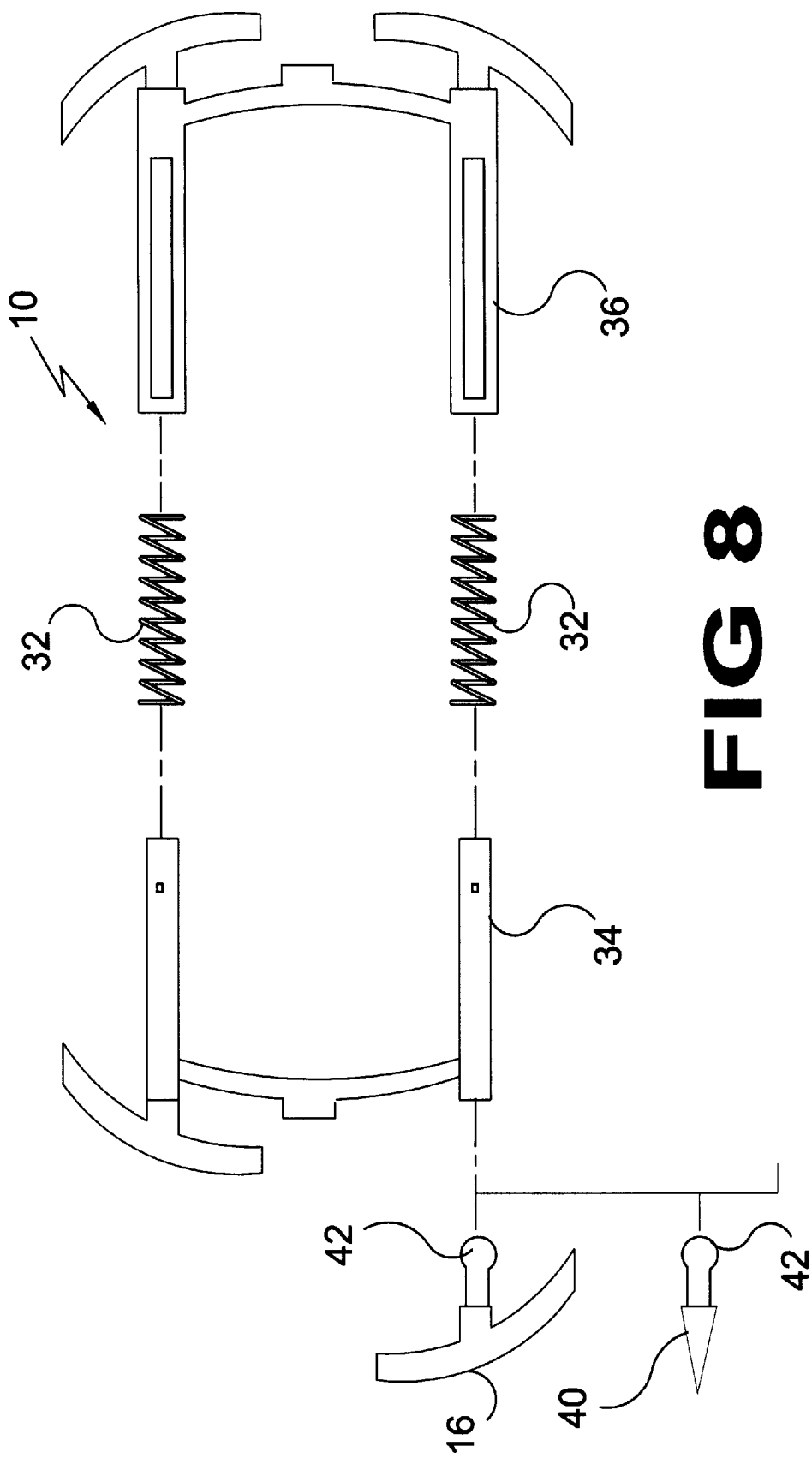

COFFEE FILTER RESTRAINT AND FLAVOR SYSTEM

BACKGROUND OF THE INVENTION

1. Field of the Invention

The present invention relates generally to coffee filter restraints and more specifically to a coffee filter restraint and distribution and flavor system. The present invention consists of a plastic two piece filter restraint, housing a spring within each two post portions of the device and held captive when each portion of the restraint are joined together. Also housing four pivotal end tabs that are removable, pivotal, circular wedge angled supports or optional straight wedge shaped supports that will accommodate the standard circular or square coffee filter holder assembly. The filter device of the present invention is designed to keep the coffee filter from collapsing while brewing automatic drip coffee. This is obtained by compressing the tabs on the device, inserting it inside the coffee filter and holder assembly, releasing the tabs on the device that will retain the filter firmly in position. The interchangeable angled supports will accommodate the circular or square type filter holder assembly. Also provided, a distribution cone that will spread the flow of a steady stream of water across the coffee grounds, which is also interchangeable with a provided flavor cube tray. The flavor cube trays will allow the user to accent, enhance or flavor their original automatic drip coffee as desired.

2. Description of the Prior Art

There are other coffee restraint devices designed to retain a coffee filter. Typical of these is U.S. Pat. No. 4,963,262 issued to Johnstone on Oct. 16, 1990.

Another patent was issued to Wiggins on Jan. 5, 1993 as U.S. Pat. No. 5,176,830. Yet another U.S. Pat. No. 5,536,393 was issued to Weeks on Jul. 16, 1996 and still yet another was issued on Oct. 14, 1997 to Glucksman et al. as U.S. Pat. No. 5,676,041.

Another patent was issued to Chigira et al on Dec. 8, 1998 as U.S. Pat. No. 5,845,561.

U.S. Pat. No. 4,963,262

Inventor: Edna M. Johnstone

Issued: Oct. 16, 1990

A coffee filter paper retainer which comprises a retaining member adapted to fit within the coffee filter paper in the coffee basket of a conventional automatic drip coffee maker. The retaining member is sized and shaped so that during use the coffee filter paper is sandwiched between the retaining member and the inside of the coffee basket, thereby preventing the coffee filter paper from drooping to the point that the coffee grounds spill out of the coffee filter paper into the coffee pot while the coffee maker is brewing the coffee. The retaining member can be sized and shaped to fit the coffee basket of any particular coffee maker. The coffee filter paper retainer may also further comprise a plurality of legs that extend downwardly from the retaining member. The legs are sized and shaped to support the retaining member in its desired position within the coffee filter paper, and may also assist in preventing the coffee filter paper from drooping to the point that the coffee grounds spill out of the coffee filter paper into the coffee pot while the coffee maker is brewing the coffee.

U.S. Pat. No. 5,176,830

Inventor: Lawrence E. Wiggens

Issued: Jan. 5, 1993

A filter support fits inside a disposable coffee filter within the filter basket of an automatic drip coffee maker to prevent the side walls of the coffee filter from collapsing while coffee is being brewed. The filter support includes a base frame which rests on the bottom of the coffee filter, and a plurality of retaining members extending upwardly from the base frame for engaging the side walls of the coffee filter. The base frame includes first and second sets of horizontally extending cross members disposed at an angle to one another such that the cross members of each set intersect and join the cross members of the other set. The retaining members extend upwardly from the ends of the cross members and terminate in a free upper end. The cross members may include a downwardly extending portion which forms a leg to support the cross members in vertical spaced relation with respect to the bottom of the coffee filter.

U.S. Pat. No. 5,536,393

Inventor: Rebecca C. Weeks

Issued: Jul. 16, 1996

A coffee filter retaining insert including a retaining body having a first section that is slidably positionable with respect to a second section thereof to provide a variable diameter enclosure area, at least four resilient standoff arms having a first end secured to the exterior of the retaining body, a plurality of spaced, parallel oriented, coffee ground level indicators disposed along the interior wall of the retaining body, and an indicator assembly secured to the interior wall adjacent the spaced level indicators having a marking bead positionable along a rod member running perpendicular to the orientation of the level indicators.

U.S. Pat. No. 5,676,041

Inventor: Dov Z. Glucksman

Issued: Oct. 14. 1997

A coffee brewing apparatus for producing a selectively flavored, liquid coffee beverage, having a housing, a receptacle, securable to the housing, for retaining ground virgin coffee beans to be brewed, a dispensing means, at least partially disposed within the housing, for optionally dispensing flavored compositions into the receptacle and onto the ground coffee contained therein and brewing means, at least partially disposed within the housing, for introducing a heated liquid into the receptacle to thereby produce a selectively flavored coffee beverage is provided.

U.S. Pat. No. 5,845,561

Inventor: Noboru Chigira

Issued: Dec. 8, 1998

An apparatus for preparing a coffee beverage by supplying the ground coffee beans fed from a coffee mill for grinding coffee beans to an extractor to prepare the coffee beverage is disclosed, wherein a device for removing the silver skins out of the coffee beans ground by the coffee mill is provided therewith.

SUMMARY OF THE PRESENT INVENTION

The present invention discloses a plastic two-piece filter restraint housing having a spring within each two post portions of the device which spring is held therein when the portions of the restraint are joined together. The housing utilizes four pivotal end tabs that are removable, pivotal, circular wedge angled supports or optional straight wedge shaped supports that will accommodate the standard circular or square coffee filter holder assembly. The filter device of the present invention keeps a coffee filter from collapsing while brewing automatic drip coffee by compressing the tabs on the device, inserting them inside the coffee filter and holder assembly and then releasing the tabs of the device so that they will retain the filter firmly in position. The interchangeable angled tabs will accommodate circular or square type filter assembly. A water distribution cone is also provided that will disperse the flow of a steady stream of water across the coffee grounds, which is also interchangeable with a provided flavor cube tray. The flavor cube tray allows the user to accent, enhance or flavor their original automatic drip coffee as desired.

A primary object of the present invention is to provide a coffee filter restraint.

Another object of the present invention is to provide a plastic, spring loaded, semi-circular device that will retain a standard size coffee filter securely against the insides of a circular or square shaped filter holder assembly while the brewing process takes place.

Yet another object of the present invention is to provide four removable, pivotal, circular wedges angled supports or optional straight wedge shape supports that will accommodate the standard circular or square filter holder assembly.

Still yet another object of the present is to provide plastic pivotal wedge support extension spacers that will allow a greater distance of travel, or increased tension from the springs.

Yet another object of the present invention is to provide a device that when compressed by squeezing the two tabs towards each other, installing device, then releasing, will allow the four pivotal, wedge angled supports to secure a coffee filter in place, with the tension from the stainless steel spring.

Additional objects of the present invention will appear as the description proceeds.

The present invention overcomes the shortcomings of the prior art by providing a distribution cone that can be installed with the filter secure device to provide an even spread of water across the coffee grounds for added flavor.

The present invention overcomes the shortcomings of the prior art by providing an optional flavor cube tray that can be used during operation with the filter secure device to allow the user to change flavor or enhance their automatic drip coffee as desired.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claim.

BRIEF DESCRIPTION OF THE DRAWING FIGURES

FIG. 7 is an exploded view of the present invention.

FIG. 8 is a top view of the device of the present invention.

LIST OF REFERENCE NUMERALS

Figure 1:
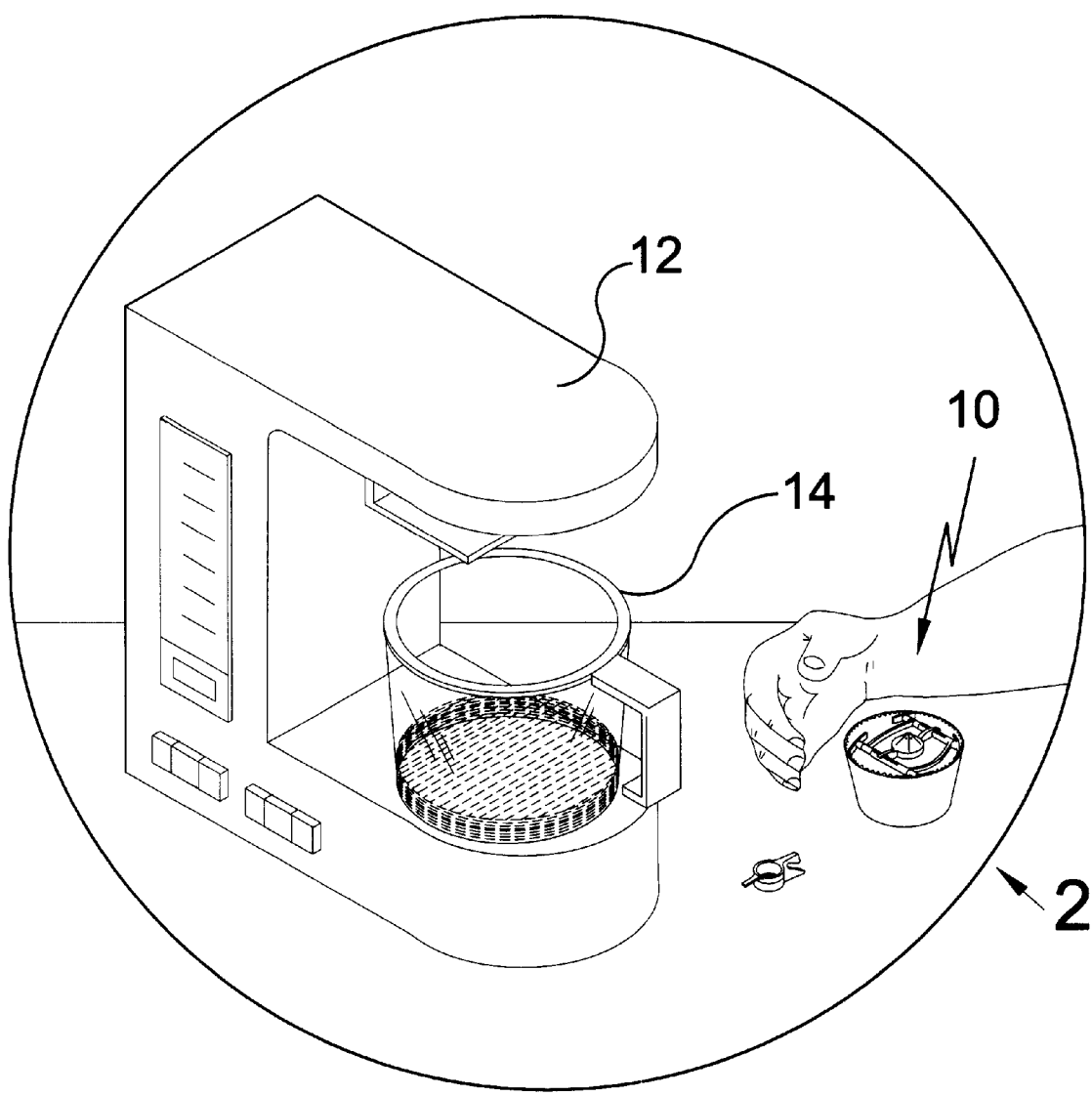
FIG. 1 is a perspective view of the present invention.

With regard to reference numerals used, the following numbering is used throughout the drawings.

10 present invention
12 automatic coffee maker
14 coffee pot
16 curved end tabs
18 coffee filter
20 coffee filter holder
22 arrow
24 coffee
26 flavor cube holder
28 water distribution cone
30 screen
32 spring
34 male part
36 female part
38 housing
40 pointed end tab
42 nipple

DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning to FIG. 1, shown therein is a pictorial view of the present invention 10 being a coffee filter restraint which is designed to keep the coffee filter from collapsing while brewing automatic drip coffee 12. This prevents any coffee grounds from entering the coffeepot 14.

Figure 2:
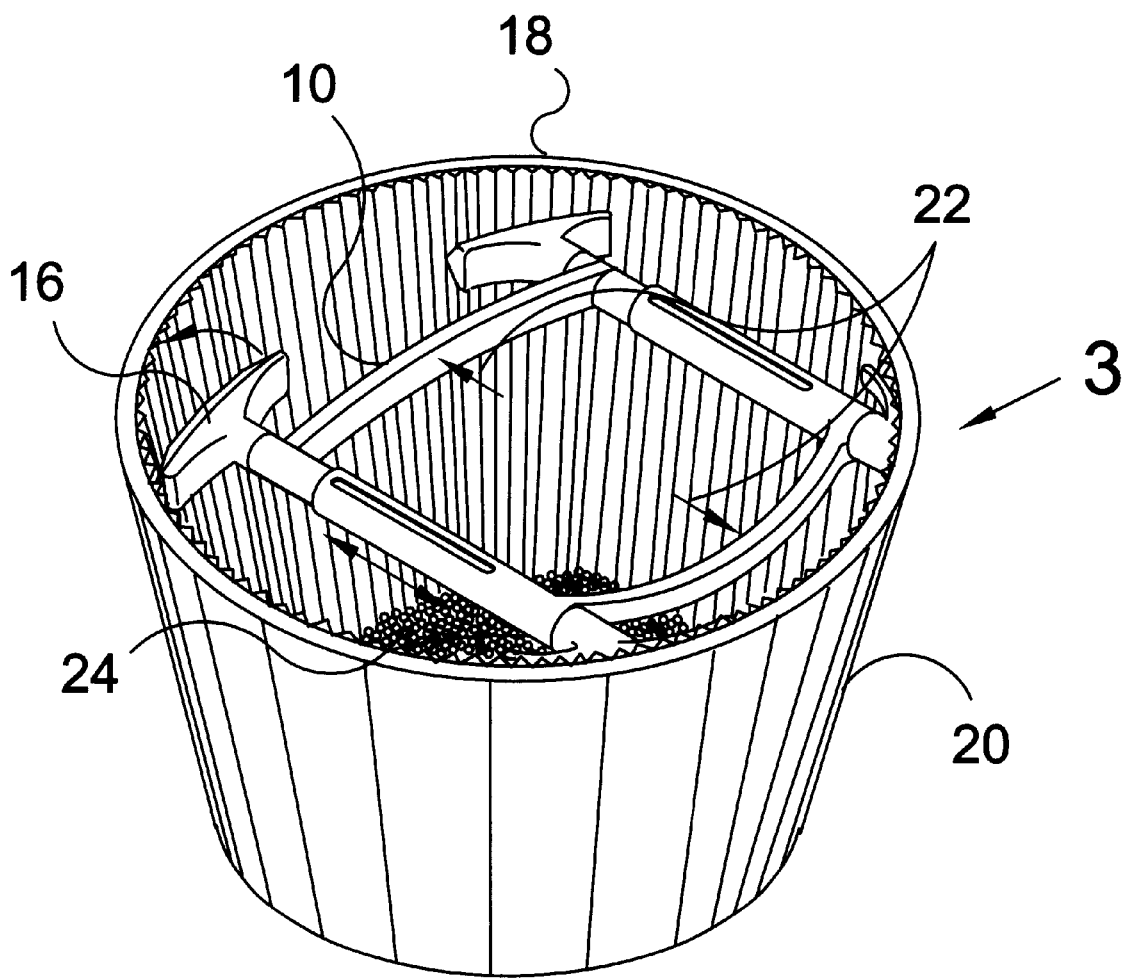
FIG. 2 is a perspective view of the present invention in use.

Turning to FIG. 2, shown therein is a perspective view of the present invention 10 in use. To use the device of the present invention, compress the swivel or pivotal end tabs 16 of the device, insert it inside the coffee filter 18 and filter holder basket, assembly or container 20, release the tabs 16 on the device so as to retain the filter 18 firmly in position. Direction arrows 22 indicate pressure being applied outwardly to filter 18. The coffeepot 24 is also shown.

Figure 3:
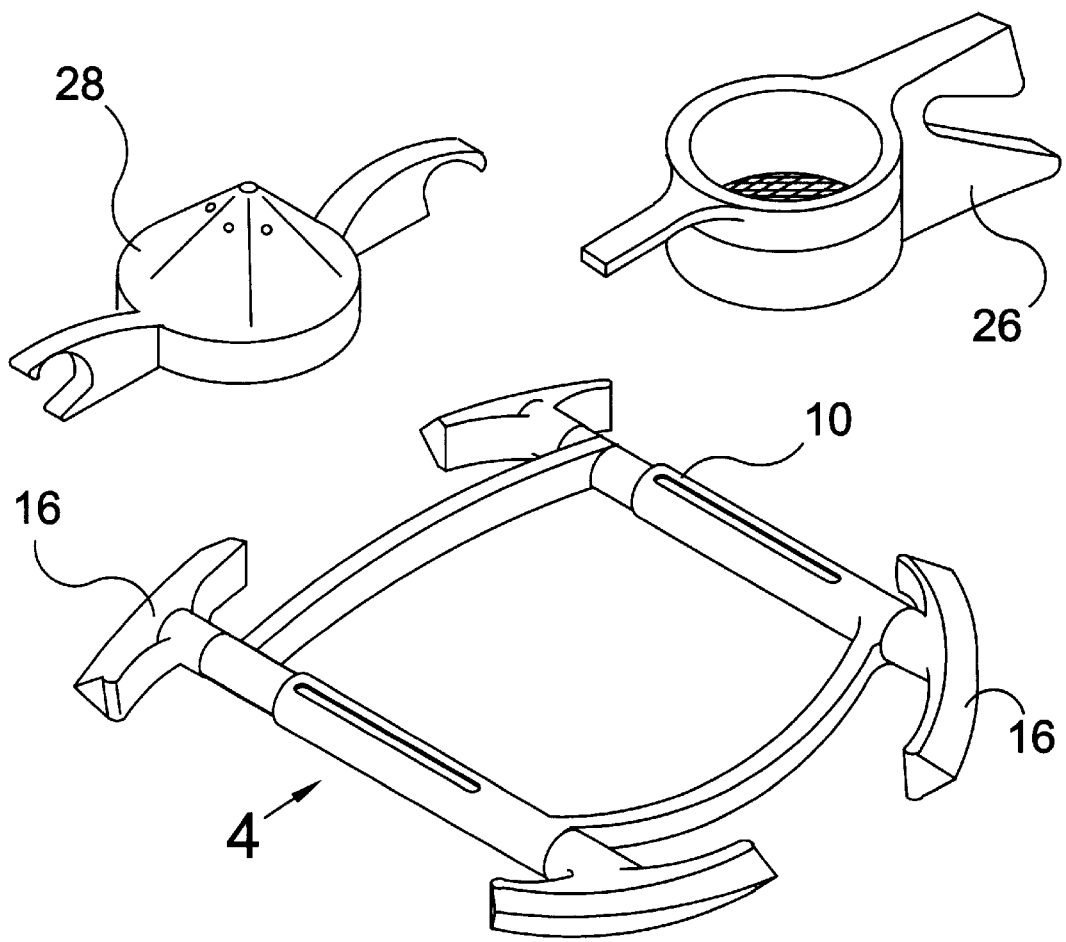
FIG. 3 is a perspective view of the present invention.

Turning to FIG. 3, shown therein is a perspective view of the present invention 10. The device of the present invention, a coffee filter restraint is installed prior to a brewing cycle and will retain the filter in proper position during the entire process. This prevents coffee grounds from mixing in the lower portion of an automatic drip coffee pot which they may do when a filter collapses. The present invention prevents a coffee filter from collapsing and coffee grounds from mixing in the lower portion of the drip coffee pot. Also shown are the pivotal end angled tabs or supports 16 along with the flavor cube tray or holder 26 and a water distribution cone 28. Both members 26, 28 have a first end and a second end which are removably disposed onto opposite sides of the filter restraint 10.

Figure 4:
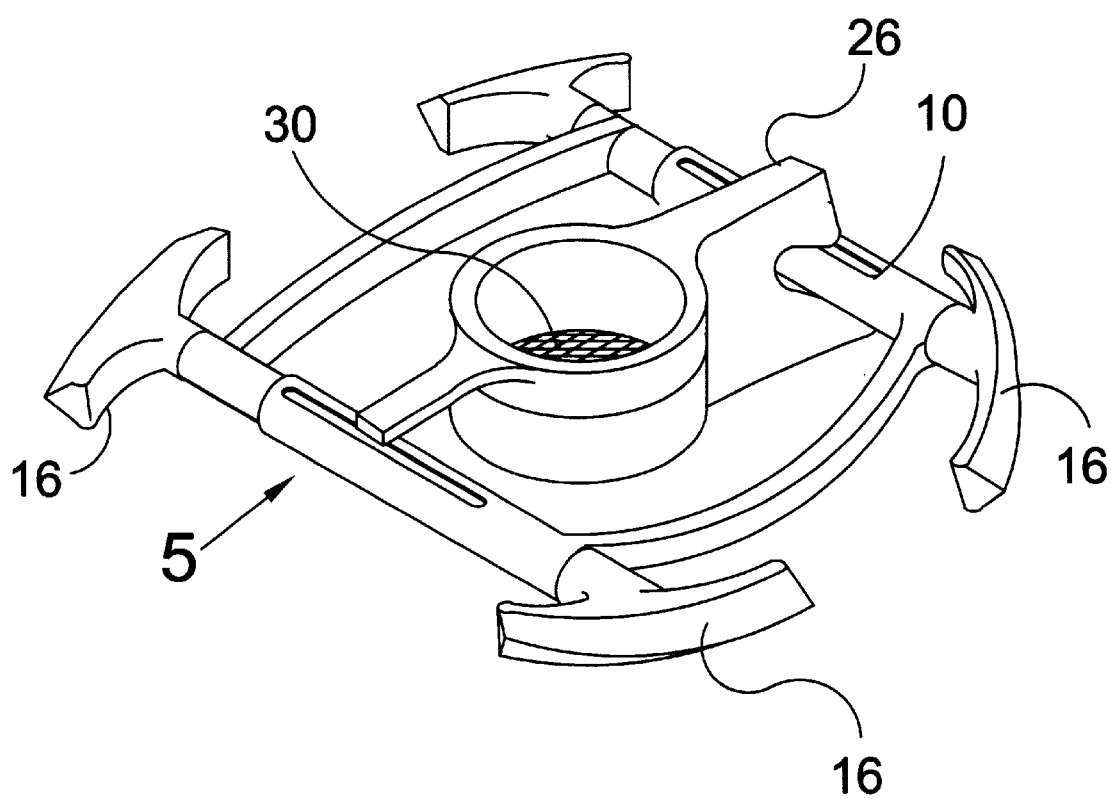
FIG. 4 is a perspective view of the present invention showing the flavor cube tray mounted on the restraint.

Turning to FIG. 4, shown therein is a perspective view of the present invention 10 showing the flavor cube tray 26 with screen 30 mounted to the restraint. The flavor cube tray 26 may be used during operation with the filter restraint 10 and allows the user an alternative way to accent or enhance the flavor of their original tasting coffee. Also shown are the pivotal end pieces 16.

Figure 5:
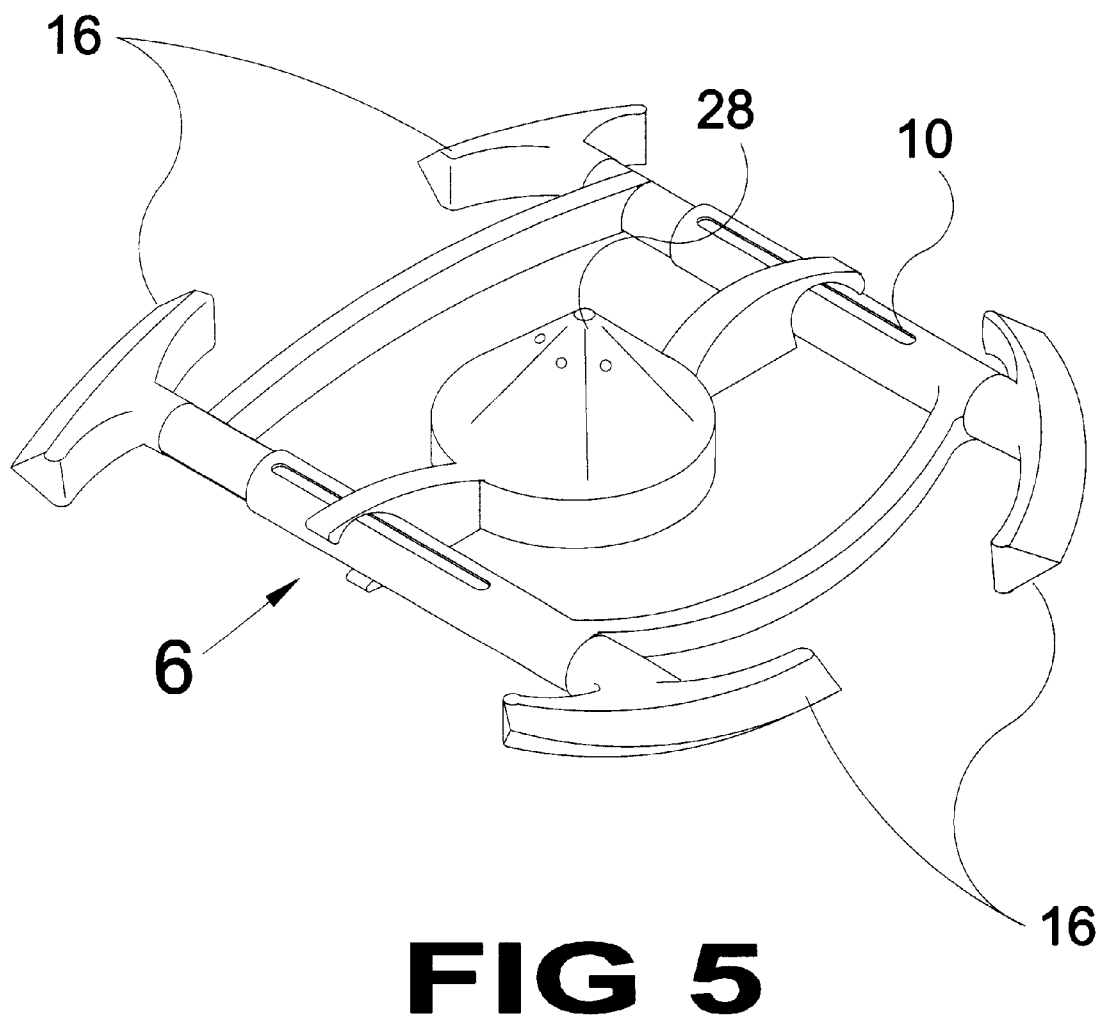
FIG. 5 is a perspective view of the present invention showing the water distribution cone mounted to the restraint.

Turning to FIG. 5, shown therein is a perspective view of the present invention 10 showing the water distribution cone 28 mounted to the restraint 10. The water distribution cone 28 may also be used during the operation with the filter restraint 10 and provides a dispersed, even flow of water across all the coffee grounds. Also shown are the pivotal end pieces 16.

Figure 6:
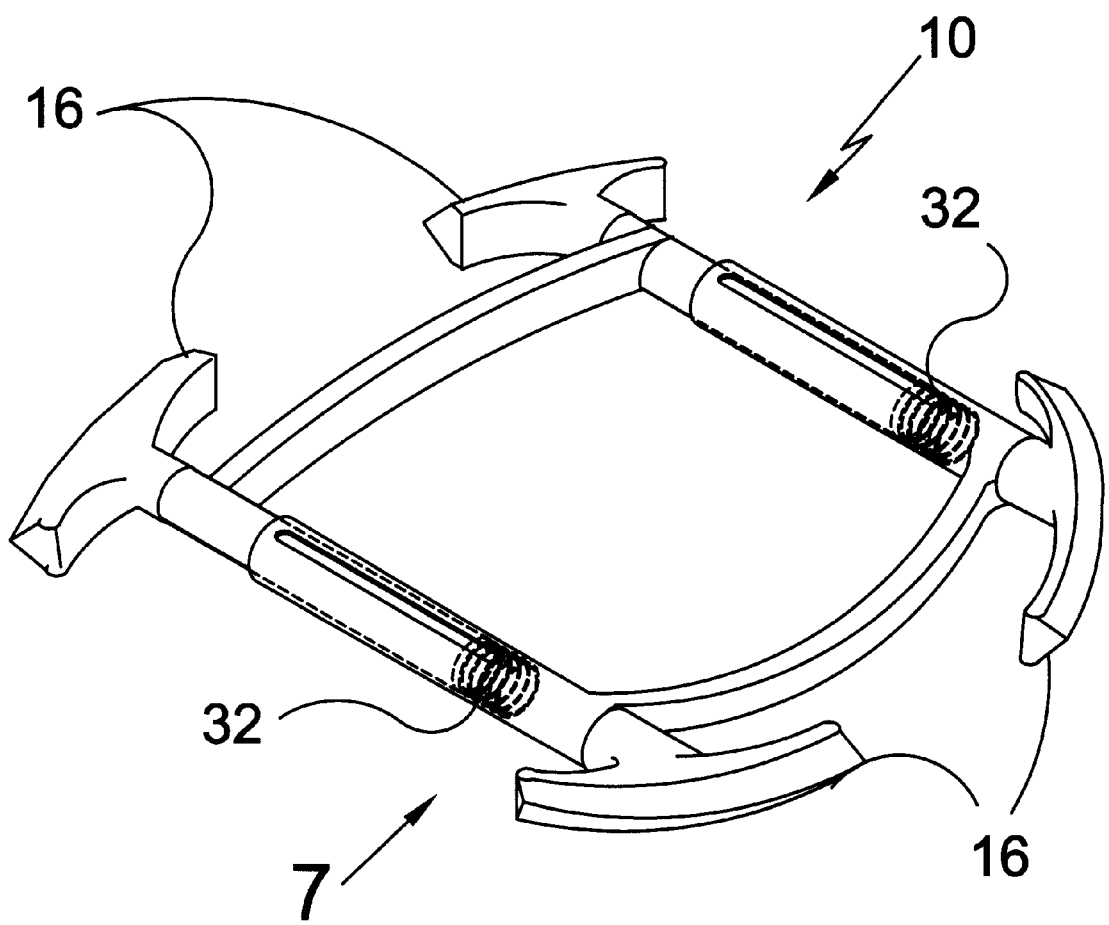
FIG. 6 is a perspective view of the present invention showing the inner spring portion of the device.

Turning to FIG. 6, shown therein is a perspective view of the present invention 10 showing the inner coil spring portion 32 of the device. The filter restraint of the present invention is designed to keep the coffee filter from collapsing while brewing. This is obtained by compressing the tabs 16 on the device, inserting it inside the coffee filter and holder assembly and releasing the tabs 16 on the device so as to retain the coffee filter firmly in position.

Turning to FIG. 7, shown therein is an exploded view of the present invention 10 showing all the internal and external components that comprise the device. Shown are the end tabs 16, springs 32 and male 34 and female 36 portions of the housing 38. The housing 38 is made of a pair of elongated, tubular, parallel members with springs 32 therein.

Turning to FIG. 8, shown therein is a top view of the device of the present invention 10. All four pivotal ends 16 may be removed and replaced with the pointed end 40 to accommodate a square style coffee filter holder. Also shown are the spring 32 and the male 34 and female 36 housing member. Pivotal ends 16, 40 have an enlarged nipple 42 thereon for placement in the hollow ends of members 34, 36 which allow the ends 16, 40 to rotate and be removable.

I claim:

1. An apparatus for retaining a disposable coffee filter within its basket for use with a coffeepot on an automatic coffee maker, the filter having coffee grinds therein, comprising:
   a) a pair of elongated tubular housing members, said housing members being spaced apart, said housing members being parallel for placement across the inside of the coffee filter, said housing members being generally horizontally disposed internal the coffee filter;
   b) a pair of cross-members connecting said pair of tubular housing members for support thereby forming a frame;
   c) a tab disposed on each end of each pair of said tubular housing members for placement contiguous to a coffee filter within its basket so as to retain the coffee filter within its basket; and,
   d) means for urging said tabs apart whereby the coffee filter is retained within its basket, wherein said means for urging said tabs apart is held within a horizontal portion of said tubular housing members.

2. The apparatus of claim 1, wherein said tabs are foot shaped.

3. The apparatus of claim 2, wherein said tabs are curvilinear, said tabs being complementarily shaped as the inside surface of the coffee filter to retain the coffee filter within its basket.

4. The apparatus of claim 1, wherein said tabs are pointed.

5. The apparatus of claim 1, wherein said tabs are rotatable.

6. The apparatus of claim 5, wherein said tabs are removable.

7. The apparatus of claim 6, wherein said ends of said tubular housing members have a respective cavity therein.

8. The apparatus of claim 7, said tabs further comprise an enlarged nipple thereon, said cavities of said tubular housing members adapted for receiving said enlarge nipples so that said tabs are removable and rotatable.

9. The apparatus of claim 8, wherein said means for urging said tabs apart further comprise said tubular housing members having a first male portion and a second female portion, said male portion being slidable within said female portion so that the length of said tubular housing member is variable, said male portion and said female portion being hollow therein.

10. The apparatus of claim 9, further comprising a spring member for insertion into said hollow part of said male portion and said female portion so that said male and said female portions are urged apart.

11. The apparatus of claim 10, wherein said spring member is a coil spring.

12. The apparatus of claim 11, further comprising a flavor cube tray centrally disposed between said elongated tubular housing members, said tray being disposed over said coffee and adapted to hold flavor cubes.

13. The apparatus of claim 12, wherein said flavor cube tray has a first end removably connected to one elongated tubular housing member and a second end removably connected to the other elongated tubular housing member.

14. The apparatus of claim 12, further comprising a screen disposed in said tray so that water can pass over the flavor cubes and into the coffee filter.

15. The apparatus of claim 11, further comprising a water distribution cone centrally disposed between said elongated tubular housing members, said cone having multiple apertures therein so that water can flow through the apertures into the coffee filter.

16. The apparatus of claim 15, wherein said water distribution cone has a first end removably connected to one elongate tubular housing member and a second end removably connected to the other elongated tubular housing member.

\* \* \* \* \*